United States Patent

[11] 3,634,810

[72] Inventor Donald L. Pemberton
 Richmond, Va.
[21] Appl. No. 8,303
[22] Filed Feb. 3, 1970
[45] Patented Jan. 11, 1972
[73] Assignee Reynolds Metals Company
 Richmond, Va.

[54] ELECTRICAL BUS BAR CONSTRUCTION AND METHOD OF MAKING SAME
 18 Claims, 7 Drawing Figs.

[52] U.S. Cl. .................................................. 339/22 B,
 339/278 C, 174/72 B, 174/129 B, 174/133 B
[51] Int. Cl. ............................................................ H01r 13/60
[50] Field of Search ............................................... 339/20, 21,
 22 B, 278; 174/71 B, 82 B, 88 B, 99 B, 133 B, 129; 72/377

[56] References Cited
 UNITED STATES PATENTS
 3,126,240 3/1964 Christensen et al. ......... 174/99 B X
 3,170,747 2/1965 Herrmann et al. ............ 339/22 B FOREIGN PATENTS
 1,261,217 2/1968 Germany ..................... 174/72 B
 OTHER REFERENCES
 Electric World, Mar. 7, 1966, " Aluminum Bus Bars Get Tin–Plating Finish"

*Primary Examiner*—Richard E. Moore
*Assistant Examiner*—Robert A. Hafer
*Attorney*—Glenn, Palmer, Lyne, Gibbs & Thompson

ABSTRACT: An improved bus bar and method of making same is disclosed wherein an elongated electrical conductor is formed having a roughly V-shaped cross-sectional configuration comprised of a bight and a pair of diverging legs having inside surfaces which are easily accessible and the inside surfaces are initially coated with an electrically conductive metallic material having a lower surface resistivity of oxidation than the electrical conductor and the coated conductor is then worked so that the diverging legs are arranged in substantially parallel relation to define a receptacle for an associated male unit. This disclosure also presents an improved bus bar assembly and method of making same.

PATENTED JAN 11 1972 3,634,810
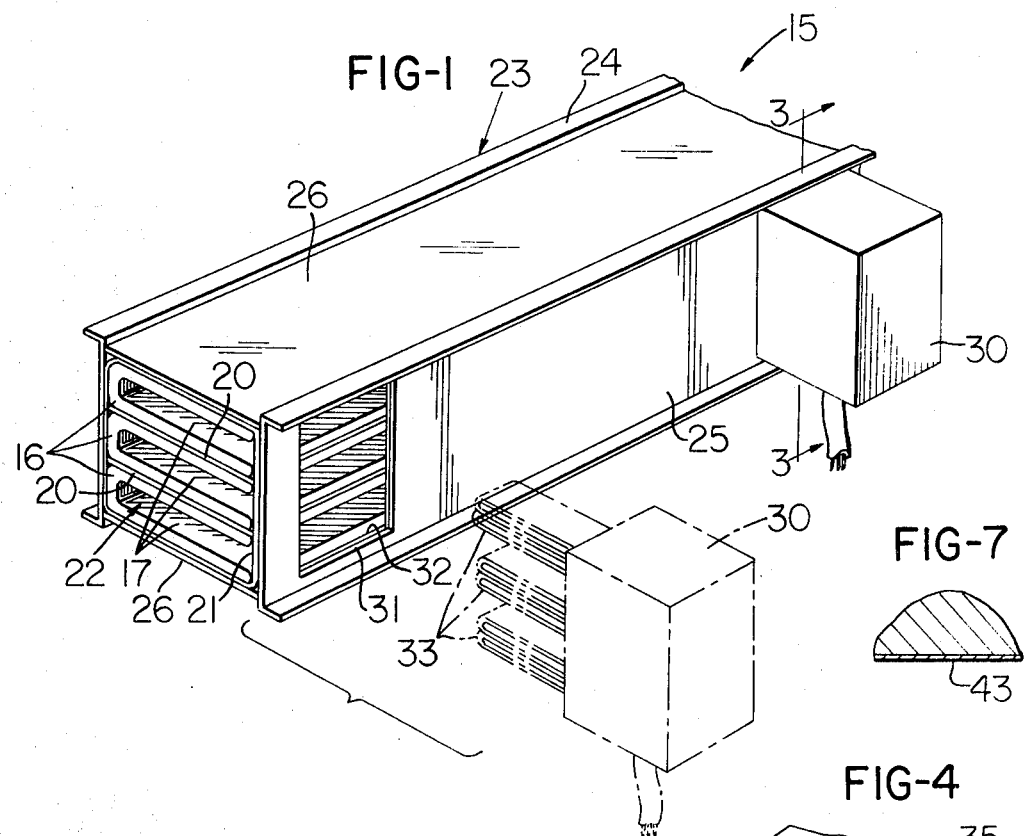
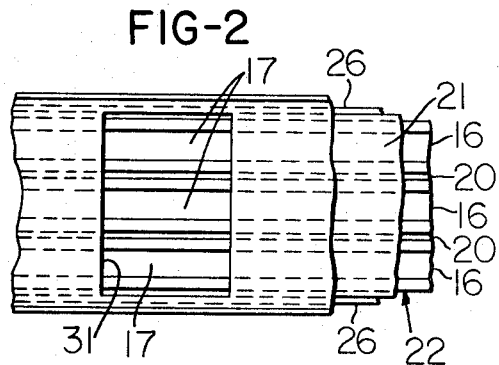
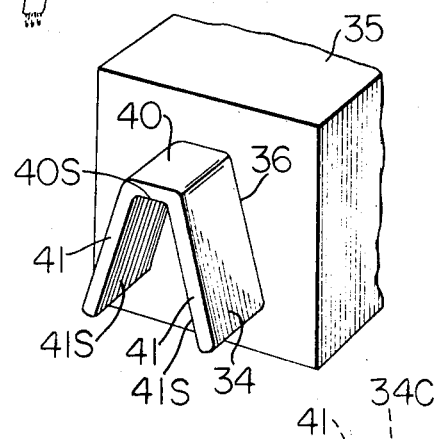
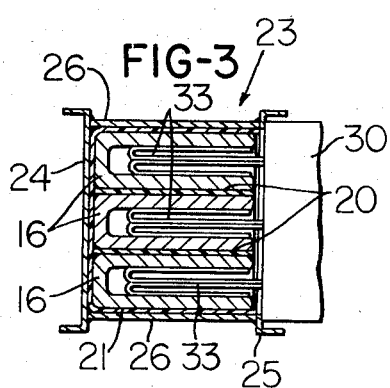
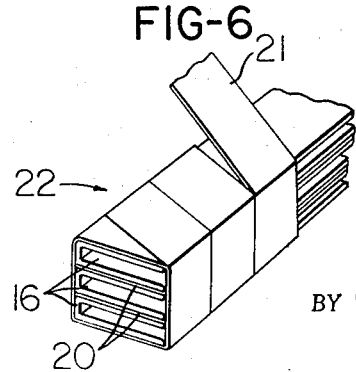
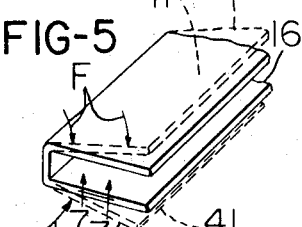
INVENTOR.
DONALD L. PEMBERTON
BY Glenn, Palmer, Lyne,
Gibbs & Thompson
HIS ATTORNEYS

3,634,810

ELECTRICAL BUS BAR CONSTRUCTION AND METHOD OF MAKING SAME

BACKGROUND OF THE INVENTION

High capacity electrical power systems rated at 250–10,000 amperes are in common use in industrial facilities such as manufacturing plants, for example, as the source of power for machine tools, conveyor systems, assembly machines, inspection machines, air-conditioning units and numerous other devices. To provide optimum versatility of operations, these manufacturing plants generally use numerous high capacity bus bar assemblies which enable easy plug-in of a plurality of devices without requiring expensive and time-consuming rewiring of each machine that is placed in operation in the manufacturing plant. The high capacity bus bar assemblies in current use are generally deficient because they operate at high impedance levels, occupy excessive space, are not very efficient in transmitting heat away therefrom, and are generally very expensive because of inefficient methods used to make such assemblies.

SUMMARY

This invention provides an improved bus bar and method of making same generally overcoming the deficiencies of the present constructions and methods wherein an elongated electrical conductor is formed having a roughly V-shaped cross-sectional configuration comprised of a bight and a pair of diverging legs having inside surfaces which are easily accessible. The inside surfaces of such conductor are coated with a metallic material having a lower surface resistivity of oxidation than the base metal of the electrical conductor and the coated conductor is then worked so that the diverging legs thereof are arranged in substantially parallel relation to define a receptacle for an associated male member of a plug-in unit. This invention also provides an improved bus bar assembly and method of making same which overcome the deficiencies of present assemblies and methods, yet result in the production of a bus bar assembly with optimum economy.

Other details, uses, and advantages of this invention become apparent as the following description of the exemplary embodiments thereof presented in the accompanying drawing proceeds.

BRIEF DESCRIPTION OF THE DRAWING

The accompanying drawing shows present exemplary embodiments of this invention, in which FIG. 1 is a perspective view with parts broken away illustrating one exemplary embodiment of a bus bar assembly of this invention particularly adapted to receive a plurality of plug-in units and illustrating by dotted lines a typical plug-in unit prior to plugging into the assembly;

FIG. 2 is a front view in elevation of a portion of the assembly of FIG. 1 with selected portions broken away and particularly illustrating opening means provided in the assembly for receiving a plug-in unit and the arrangement of individual bus bars, insulating strips, and a tapelike insulating material wrapped around the bus bars;

FIG. 3 is a cross-sectional view with parts broken away taken essentially on the line 3—3 of FIG. 1; FIG. 4 is a fragmentary perspective view particularly illustrating the manner of forming an elongated electrical conductor having a roughly V-shaped cross-sectional configuration by extrusion through an associated die;

FIG. 5 is a fragmentary perspective view particularly illustrating the manner of working the V-shaped conductor by urging its legs (after coating the inside surfaces thereof) from diverging dotted line positions into substantially parallel relation;

FIG. 6 is a fragmentary perspective view illustrating a plurality of bus bars arranged with their open ends facing in the same direction and illustrating the manner of wrapping a high strength insulating tapelike material therearound to produce an electrically insulated beamlike construction; and FIG. 7 is a fragmentary cross-sectional view taken essentially on the line 7—7 of FIG. 5 and particularly illustrating the layer or coating clad on the inside surface of the V-shaped form so that the final bus bar has a special cladding on its inside surface.

DESCRIPTION OF ILLUSTRATED EMBODIMENTS

Reference is now made to FIG. 1 of the drawings which illustrates one exemplary embodiment of a bus bar assembly of this invention which is designated generally by the reference numeral 15. The bus bar assembly 15 is comprised of a plurality of three elongated electrical bus bars 16 each having a substantially U-shaped cross-sectional configuration and each having an outwardly open channel 17 provided therein so that it extends along the full length thereof.

A layer of an electrical insulating material shown as a comparatively thin insulating sheet 20 is provided between each immediately adjacent pair of bus bars 16. The bus bars 16 are arranged with their open channels 17 facing in one direction, forwardly as shown in the drawings, and a high strength electrical insulating tapelike material or tape 21 is provided around the plurality of bus bars 16 to define an electrically insulated beamlike construction which is designated generally by the reference numeral 22.

The construction 22 is installed and suitably supported within an outer housing 23 which in this example is comprised of a rear channel member 24, a front channel member 25 and a pair of oppositely arranged parallel plates 26 which are suitably fastened to channel members 24 and 25 as by welding, or the like, to define a boxlike construction having a substantially rectangular cross-sectional configuration. In this example, the housing 23 is comprised of four parts; however, it will be appreciated that such housing may be formed as a single piece unit, by extrusion for example, or may be made having any desired plurality of component parts.

The assembly 15 has access means for a plurality of plug-in units 30; and, in this example, each access means is in the form of a rectangular opening 31 provided in the front channel member 25 which is aligned with a cooperating rectangular opening 32 provided in the tapelike material 21. Each opening 32 may be out in the tape 21 in aligned relation with its associated opening 31 after insertion of the beamlike construction 22 within housing 23 or each opening 32 may be precut in the proper position prior to insertion of construction 22 within its housing.

The assembly 15 is used in a three-phase AC electrical system to provide three-phase power to associated devices whereby a plurality of three bus bars 16 are required in such assembly. Thus, each plug-in unit 30 has a plurality of three male members 33 which may be in the form of resilient spring members. Each member 33 is adapted to be easily inserted within an associated open channel 17 and during such insertion the member 33 is yieldingly compressed vertically reducing its vertical height or thickness and providing a tight fit and a high quality electrical and mechanical connection. However, it will be appreciated that the bus bar assembly may be provided with any desired number of bus bars 16 as required by its associated electrical system and each associated plug-in unit would have a corresponding number of male members.

As previously indicated, the bus bar 16 has a substantially U-shaped cross-sectional configuration and is capable of carrying high currents generally of the order of 250 to 10,000 amperes and the bus bar 16 is preferably made by first forming an elongated electrical conductor 34 by extrusion through an associated extrusion die 35 having a die opening 36 as shown in FIG. 4 of the drawings. The die opening 36 is a roughly V-shaped opening, as viewed in cross section, whereby the extruded member 34 has a corresponding roughly V-shaped cross-sectional configuration. The member 34 is comprised of a bight 40 and a pair of diverging legs each designated by the reference numeral 41 and the bight 40 and legs 41 have inside surfaces 40S and 41S respectively which are readily accessible due to the V-shaped configuration.

The inside surfaces 40S and 41S are then coated with a suitable electrically conductive material to define a coated conductor which is shown by dotted lines in FIG. 5 and designated by the reference numeral 34C. The coating 43 applied on member 34 (see FIG. 7) may have a thickness generally of the order of a few ten-thousandths of an inch; however, such coating may be as thick as several thousandths. In one application of this invention, a coating of tin ranging in thickness between 0.0001 and 0.0003 inch can be used successfully.

The V-shaped coated conductor 34C is then worked by applying bending forces indicated by arrows F so that its diverging legs 41 are moved from their dotted line positions, shown in FIG. 5, inwardly to the illustrated solid line positions to thereby define a completed bus bar 16. In particular, it will be seen that the diverging legs 41 are bent inwardly so that they are arranged in substantially parallel relation and define the U-shaped configuration of the bus bar 16.

During normal use, each assembly 15 and hence each bus bar 16 is used in environments where it is contacted by air which tends to oxidize its surfaces; therefore, to assure that the inside surfaces provide an optimum electrical connection with the male members 33 of an associated plug-in unit 30, it is common practice to coat the inside surfaces 40S and 41S with a suitable electrically conductive material previously mentioned. The coating material is preferably an electrically conductive material which has a lower surface resistivity of oxidation than the base or parent metal comprising the elongated member 34. To further explain this point, it will be appreciated that during oxidation, the products of oxidation form on and adhere to the surface of an electrical conductor and some products of oxidation have great surface resistivity whereby an optimum electrical contact cannot be provided. Thus, the term "surface resistivity of oxidation" defines the surface resistivity which is provided by a metallic material after substantial oxidation has taken place.

The substantially open or V-shaped member 34 is usually clad or coated by the process of electrolytic deposition or electroplating as it is often called. It has been found that by providing the substantially V-shaped form of the inside surfaces 40S and 41S may be coated with optimum efficiency and upon working, i.e., compressing, the legs 41 of member 34 inwardly, there is no damage to the coating 43 thus formed whereby the completed bus bar 16 is of optimum quality.

The extrusion provided from the die 35 may be cut to any suitable length ranging from a few feet to 20, 30, 40, or more feet depending upon the intended application, and for convenience such extension is designated by the reference numeral 34 before as well as after cutting. To define an assembly 15, a plurality of cut members 34 are first coated and then formed to define U-shaped bus bars 16. The bus bars 16 are then stacked with comparatively thin sheets of electrical insulating material 20 arranged between the outside surfaces of associated legs and then a high strength electrically insulating tapelike material 21 is wrapped around the bus bars 16 to define the beamlike construction 22 previously mentioned and such wrapping is achieved essentially in the manner illustrated in FIG. 6 of the drawings.

The beamlike construction 22 has the high structural integrity which is characteristic of a beam which is defined by a plurality of elongated component members which are held together as an integral unit. In addition, the beamlike construction 22 provides optimum short circuit bracing in a manner which is not possible using bus bar assemblies of the character provided heretofore.

The construction of the bus bars 16 enables the forming of the assembly 15 having optimum compactness including a minimum cross-sectional configuration. In addition, by using comparatively thin and highly efficient insulating sheets 21 between bus bars 16 and wrapping such bus bars with the tapelike material in the manner illustrated in FIG. 6, the amount of electrical insulation may be kept at a minimum, yet without reducing such insulation below safe limits. The construction and arrangement of the U-shaped bars 16 is also effective in lowering the impedance of the bus bar assembly 15.

Any suitable electrically conductive material may be used to make the bus bars 16; however, such bus bars are preferably made of a metallic material containing aluminum. In one application of this invention, excellent results could be obtained utilizing 6101-T6 aluminum.

The inside surfaces of V-shaped members 34 made of aluminum-coating materials may be coated with materials having a lower surface resistivity of oxidation than aluminum and typical coating materials are tin, copper, and silver. Thus, by making the bus bars 16 from aluminum, lightweight units are provided which have optimum strength and by coating the inside surfaces 40S and 41S of the V-shaped members 34 used to make bus bars 16, the surfaces of these bus bars which are to be engaged by male contactors are provided with optimum protection against oxidation.

In this example of the invention, the coating 43 on the inside surfaces 40S and 41S of each V-shaped member 34 has been described as being provided by electrolytic deposition. However, it will be appreciated that any suitable coating or cladding technique may be utilized, such as roll cladding, hot metal cladding, spray coating using molten metal, etc., provided that such coating or cladding is achieved in a substantially V-shaped form which does not require substantial working to define the final U-shaped configuration of the bus bar 16 and hence does not damage the character and quality of the cladding material during such working.

In this example of the invention, each member 34 has been made having a V-shaped configuration by extrusion through an associated extrusion die. However, it will be appreciated that in some applications of this invention, the V-shaped configuration may also be defined by roll forming.

The housing 23 is preferably made of a material, such as a metallic material containing aluminum, which has high thermal conductivity whereby heat from the assembly 15 is rapidly conducted to the surrounding environment such as the surrounding air and the entire bus bar assembly 15 operates in a cooler and more efficient manner. Good results have been obtained making such housing by extrusion using 6063-T6 aluminum alloy and by roll forming using 3003 aluminum alloy.

While present exemplary embodiments of this invention, and methods of practicing the same, have been illustrated and described, it will be recognized that this invention may be otherwise variously embodied and practiced within the scope of the following claims.

What is claimed is:

1. A method of making an electrical bus bar comprising the steps of, forming an elongated electrical conductor having a roughly V-shaped cross-sectional configuration comprised of a bight and a pair of diverging legs having inside surfaces which are easily accessible, coating said inside surfaces with an electrically conductive metallic material to define a coated conductor, and working the coated conductor so that said diverging legs are arranged in substantially parallel relation to define a plug-in receptacle for a male unit, said V-shaped cross-sectional configuration requiring minimum working of said coated conductor to thereby assure there is no damage to the coating applied on said inside surfaces.

2. A method as set forth in claim 1 in which said forming step comprises forming said electrical conductor by an extrusion process.

3. A method as set forth in claim 1 in which said coating step comprises coating said inside surfaces with an electrically conductive material having a lower surface resistivity of oxidation than said electrical conductor.

4. A method as set forth in claim 1 in which said coating step comprises electrolytically depositing a coating on said inside surfaces having a thickness generally of the order of ten-thousandths of an inch.

5. A method as set forth in claim 1 in which said forming step comprises extruding a metallic material containing aluminum, said working step comprises mechanically bending said diverging legs toward each other, and said coating step comprises coating said inside surfaces with said electrically conductive material having a lower surface resistivity of oxidation than said electrical conductor.

6. A method of making a plug-in electrical bus bar assembly comprising the steps of, providing a plurality of elongated electrical bus bars each having a substantially U-shaped cross-sectional configuration defined by a bight and a pair of substantially parallel legs extending therefrom to define an open channel along the full length thereof, arranging said bus bars with their open channels facing in the same direction, placing a layer of an electrical insulating material between each immediately adjacent pair of said bus bars, wrapping a high strength electrically insulating tapelike material around said bus bars to produce an electrically insulated beamlike assembly, and providing access openings in said tapelike material enabling male members of a plug-in unit to be inserted within said open channels.

7. A method as set forth in claim 6 and comprising the further step of installing said beamlike assembly in a protective housing having a plurality of cutouts therein so that said access openings are aligned with said cutouts to enable said male members to be easily inserted within said open channels.

8. A method as set forth in claim 7 in which said placing step comprises placing said electrical insulating material in the form of a thin sheet between each immediately adjacent pair of said bus bars, said wrapping step comprises wrapping said tapelike material so that the total thickness of the tapelike material is kept at a minimum, and said installing step comprises installing said beamlike assembly in said protective housing made of a highly thermally conductive material so that heat buildup in said assembly is easily conducted to the surrounding environment.

9. A method as set forth in claim 6 in which said providing step comprises individually forming each of said plurality of elongated electrical bus bars so that initially each has a roughly V-shaped cross-sectional configuration comprised of said bight and a pair of diverging legs having inside surfaces which are easily accessible, coating said inside surfaces of said bight and diverging legs of each bus bar with a metallic material to define a coated conductor, and working the coated conductor so that the diverging legs thereof are arranged in substantially parallel relation to define said substantially U-shaped cross-sectional configuration.

10. A method as set forth in claim 9 in which said forming step comprises forming each of said electrical conductors by an extrusion process.

11. A method as set forth in claim 9 in which said forming step comprises roll forming each of said electrical conductors.

12. A method as set forth in claim 9 in which said coating step comprises electrolytically depositing a coating on said inside surfaces of each of said electrical bus bars having a thickness generally of the order of ten-thousandths of an inch.

13. A method as set forth in claim 9 in which said coating step comprises electrolytically depositing a coating of an electrically conductive material on said inside surfaces of each of said electrical bus bars wherein said material has a lower surface resistivity of oxidation than the base material comprising the bus bar.

14. A method as set forth in claim 9 in which said forming step comprises extruding a metallic material containing aluminum to define each of said bus bars, said working step comprises mechanically bending the diverging legs of each bus bar toward each other, and said coating step comprises coating the inside surfaces of each of said bus bars with an electrically conductive material having a lower surface resistivity of oxidation than the metallic material of the bus bars.

15. An electrical bus bar assembly comprising, a plurality of elongated electrical bus bars each having a substantially U-shaped cross-sectional configuration defined by a bight and a pair of substantially parallel legs extending therefrom to define an open channel along the full length thereof, a layer of electrical insulating material between each immediately adjacent pair of bus bars, and a tapelike material around said bus bars with said bus bars arranged with their open channels facing in the same direction, said tapelike material providing an electrically insulated beamlike assembly having high structural strength and providing optimum short circuit bracing, said tapelike material having access openings provided therein enabling the male members of a plug-in unit to be inserted within said open channels.

16. An assembly as set forth in claim 15 and further comprising a protective housing for said beamlike assembly, said housing having a plurality of cutouts therein arranged in aligned relation with said access openings.

17. An assembly as set forth in claim 16 in which each layer of electrical insulating material between each immediately adjacent pair of bus bars is in the form of a thin insulating sheet, said tapelike material is in the form of a high-strength tape which is wrapped in position so that the thickness of insulation is kept at a minimum yet is sufficient to provide optimum electrical insulation, and said protective housing is made of a metallic material which is a good heat conductor so that heat buildup in said bus bar assembly is conducted to the environment in which said assembly is placed with optimum efficiency.

18. An assembly as set forth in claim 17 in which each of said bus bars is made of a metallic material containing aluminum and the surfaces defining the channel in each bus bar are coated with an electrically conductive material which has a lower surface resistivity of oxidation than the metallic material of the bus bars.

* * * * *